United States Patent
Rofougaran (10) Patent No.: US 8,483,070 B2
(45) Date of Patent: *Jul. 9, 2013

(54) MILLIMETER WAVE PROBING OF COMPONENTS VIA A PROBE DEVICE AND METHODS FOR USE THEREWITH

(75) Inventor: Ahmadreza (Reza) Rofougaran, Newport Coast, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/444,811

(22) Filed: Apr. 11, 2012

(65) Prior Publication Data

US 2012/0196542 A1 Aug. 2, 2012

Related U.S. Application Data

(63) Continuation of application No. 12/326,187, filed on Dec. 2, 2008, now Pat. No. 8,184,543.

(51) Int. Cl.
*H04B 7/00* (2006.01)

(52) U.S. Cl.
USPC .......................................... 370/241; 370/310

(58) Field of Classification Search
None
See application file for complete search history.

(56) References Cited

U.S. PATENT DOCUMENTS

| | | | |
|---|---|---|---|
| 2009/0153158 A1* | 6/2009 | Dunn et al. | 324/750 |
| 2010/0097967 A1* | 4/2010 | Kwon et al. | 370/310 |
| 2011/0188417 A1* | 8/2011 | Pettus et al. | 370/310 |

* cited by examiner

*Primary Examiner* — Min Jung
(74) *Attorney, Agent, or Firm* — Garlick & Markison; Bruce E. Stuckman (57) ABSTRACT

Probe data is directly communicating between a probe device and a component of an external device via a wireless millimeter wave communication path. A probe application is executed in accordance with the probe data, for diagnostics and testing, to update component software, and to upload other files and applications to the component.

20 Claims, 9 Drawing Sheets

MILLIMETER WAVE PROBING OF COMPONENTS VIA A PROBE DEVICE AND METHODS FOR USE THEREWITH

CROSS-REFERENCE TO RELATED APPLICATIONS

The present U.S. Utility patent application claims priority pursuant to 35 U.S.C. §120, as a continuation, to U.S. Utility patent application Ser. No. 12/326,187, entitled MILLIMETER WAVE PROBING OF COMPONENTS VIA A PROBE DEVICE AND METHODS FOR USE THEREWITH, filed Dec. 2, 2008, which is hereby incorporated herein by reference in its entirety and made part of the present U.S. Utility patent application for all purposes.

BACKGROUND OF THE INVENTION

1. Technical Field of the Invention

This invention relates generally to communication systems and integrated circuits used therein.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As IC fabrication technology continues to advance, ICs will become smaller and smaller with more and more transistors. While this advancement allows for reduction in size of electronic devices, it does present a design challenge of providing and receiving signals, data, clock signals, operational instructions, etc., to and from a plurality of ICs of the device. Currently, this is addressed by improvements in IC packaging and multiple layer PCBs. For example, ICs may include a ball-grid array of 100-200 pins in a small space (e.g., 2 to 20 millimeters by 2 to 20 millimeters). A multiple layer PCB includes traces for each one of the pins of the IC to route to at least one other component on the PCB. Clearly, advancements in communication between ICs are needed to adequately support the forth-coming improvements in IC fabrication.

The limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
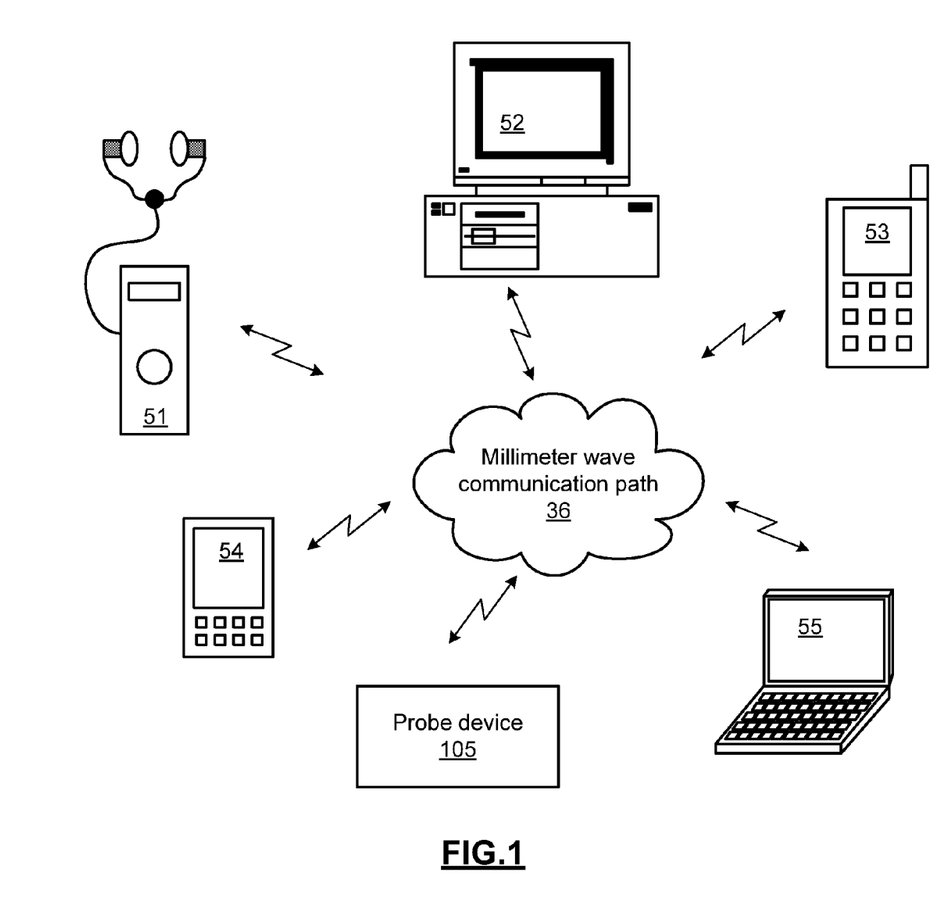
FIG. 1 presents a pictorial representation of a handheld audio unit 51, a computer 52, a wireless communication device 53, a personal digital assistant 54, and a laptop computer 55 having components in direct communication with a probe device 105 in accordance with an embodiment of the present invention.

FIG. 1 presents a pictorial representation of a handheld audio unit 51, a computer 52, a wireless communication device 53, a personal digital assistant 54, and a laptop computer 55 having components in direct communication with a probe device 105 in accordance with an embodiment of the present invention. In particular, handheld audio unit 51 can include one or more components, such as integrated circuits, that provide storage and playback of audio content such as motion picture expert group (MPEG) audio layer 3 (MP3) files or Windows Media Architecture (WMA) files, video content such as MPEG4 files for playback to a user, and/or any other type of information that may be stored in a digital format. Computer 52 can include one or more components, such as integrated circuits, that provide the processing, and input/output functionality of the computer. Computer 52 can be a desktop computer, personal computer or an enterprise storage device such as a server of a host computer that is attached to a storage array such as a redundant array of independent disks (RAID) array, storage router, edge router, storage switch and/or storage director.

In an embodiment of the present invention, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide streaming audio and/or video programming. In this fashion, wireless communication device 53 can place and receive telephone calls, text messages such as emails, short message service (SMS) messages, pages and other data messages that can include attachments such as documents, audio files, video files, images and other graphics. Wireless communication device 53 can include one or more components, such as integrated circuits, that provide the functionality of this device.

Further, personal digital assistant 54 and laptop computer 55 can include can include one or more components, such as integrated circuits, that provide the functionality of these devices including processors, memories, input/output components and other components that perform one or more functions associated with personal digital assistant 54 and laptop computer 55.

Probe device 105 is a device that executes a probe application and that can communicate probe data directly with one or more components of a probed device, such handheld audio unit 51, computer 52, wireless communication device 53, personal digital assistant 54, and/or laptop computer 55. In particular, probe device 105 communicates with these components via a millimeter wave communication path 36.

Further details regarding the operation of the probe device 105 and the devices being probed, including several optional functions and features will be provided in conjunction with FIGS. 2-12 that follow.

Figure 2:
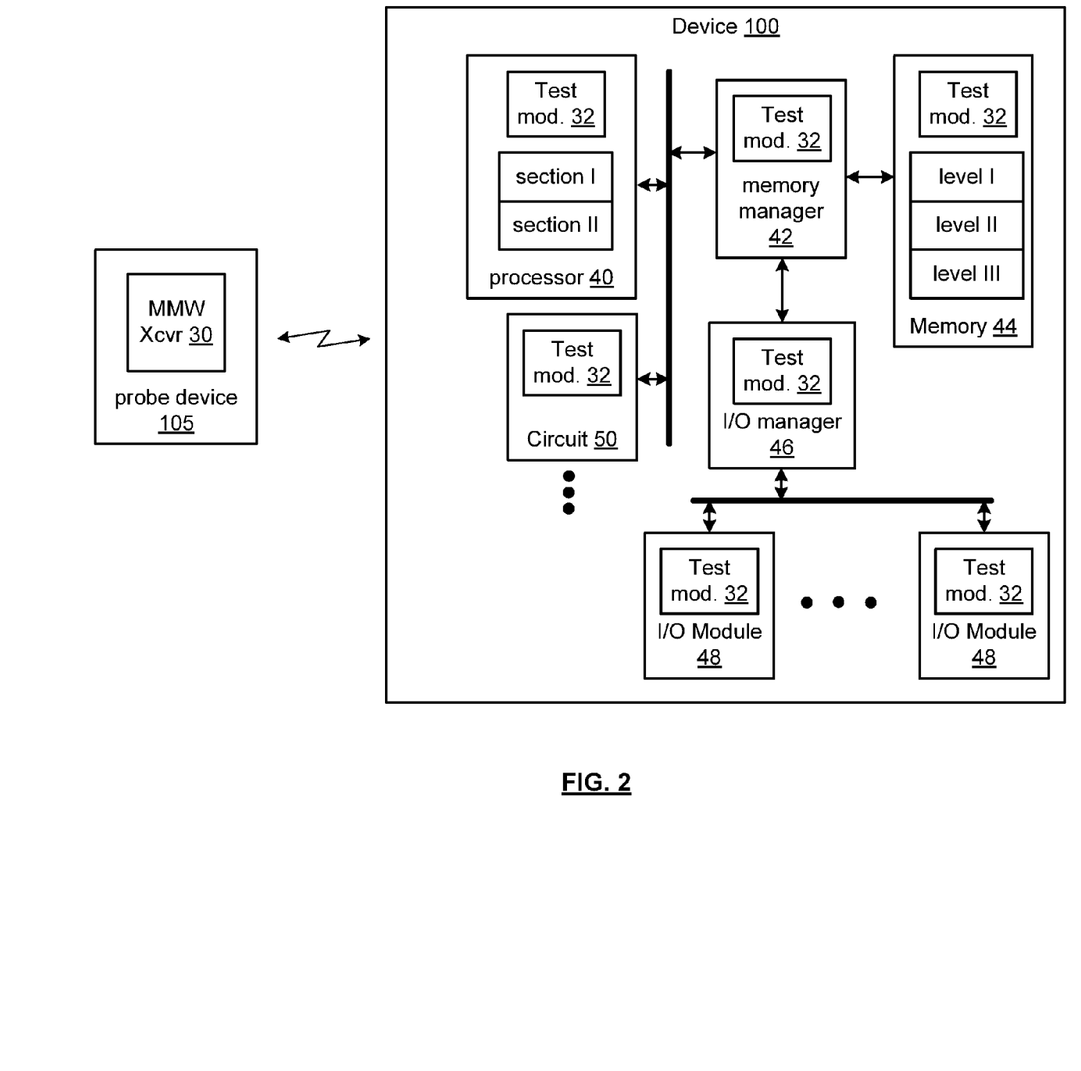
FIG. 2 presents a block diagram representation of a probe device 105 in direct communication with one or more components of device 100 in accordance with an embodiment of the present invention.

FIG. 2 presents a block diagram representation of a probe device 105 in direct communication with one or more components of device 100 in accordance with an embodiment of the present invention. Device 100, such as handheld audio unit 51, computer 52, wireless communication device 53, personal digital assistant 54, and/or laptop computer 55, includes components such as processor 40, memory manager 42, memory 44, input/output (I/O) manager 46, I/O module 48 and optionally one or more other circuits 50 that can be implemented by separate integrated circuits. In the alternative, two or more of these modules can be combined into a single integrated circuit In an embodiment of the present invention, processor 40 can be implemented via use of a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions to perform functions associated with the operation of the device 100. Memory manager 42 provides an interface for memory 44 to be accessed by processor 40 and any of the I/O modules 48 via I/O manager 46. Memory 44 may be a single memory device or a plurality of memory devices. Such a memory device may be a read-only memory, random access memory, volatile memory, non-volatile memory, static memory, dynamic memory, flash memory, a disk drive, including a removable disk drive or nonremoveable disk drive, memory card and/or any device that stores digital information such as the operational instructions executed by the processor 40, and/or other data. Note that when the processor 40 implements one or more functions via a state machine, analog circuitry, digital circuitry, and/or logic circuitry, the associated memory storing the corresponding operational instructions can be embedded with the circuitry comprising the state machine, analog circuitry, digital circuitry, and/or logic circuitry. While a particular bus architecture is shown, other architectures that include additional data busses and/or additional direct connectivity between components can likewise be implemented based on the particular functions and features of device 100.

I/O modules 48 can include a wireless transceiver and that is capable of placing a receiving conventional wireless telephone calls, voice over internet protocol telephone calls, communicating via a cellular voice or data protocol such as PCS, iDEN, GSM, GPRS, AMPS, UMTS, EDGE or other wireless telephony protocol that can be used to communicate with a service provider network, such as a wireless telephone or data network, via a base station or access point. I/O modules 48 can include a wireless transceiver, such as an RFID transceiver, a Bluetooth transceiver or other piconet or personal area network transceiver, a WIMAX transceiver or ultra wideband transceiver, a wireless local area network transceiver such as a 802.11a, b, g or n transceiver, or other wireless transceiver for communicating real time or non-real time data in association with one or more applications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications.

I/O modules 48 can further include a microphone, keypad/keyboard, speaker, display, camera, wireline port, such as an USB, Ethernet, Firewire, SCSI, PCI, PCMCIA or other wireline port, along with the appropriate interfaces, drivers, encoders and decoders for communicating via the wireline port, a codec for encoding voice signals into digital voice signals, a keypad/keyboard interface for generating data from a keypad/keyboard in response to the actions of a user, a display driver for driving a display, such as by rendering a color video signal, text, graphics, or other display data, and an audio driver such as an audio amplifier for driving a speaker and one or more other interfaces, such as for interfacing with a camera or the other I/O devices. In operation, I/O manager 46 controls the flow of I/O data to and from the various I/O modules 48, controls the operation of the various I/O modules based on commands from processor 40, and controls the buffering and storage of I/O data in memory 44 via memory manager 42.

Optional circuits 50 can include a power management circuit that includes one or more DC-DC converters, voltage regulators, current regulators or other power supplies for supplying the device 100 and/or its peripheral devices with supply voltages and or currents (collectively power supply signals) that may be required to power these devices. Such a power management circuit can operate from one or more batteries, line power, an inductive power received from a remote device, a piezoelectric source that generates power in response to motion of the integrated circuit and/or from other power sources, not shown. In particular, power management module can selectively supply power supply signals of different voltages, currents or current limits or with adjustable voltages, currents or current limits. The optional circuits 50 can include other circuit modules that perform one or more functions of the device 100.

In this embodiment of the present invention, the probe device 105 executes a probe application that generates and receives probe data for test and/or diagnostic purposes. Probe device 105 includes a millimeter wave transceiver 30 for directly communicating probe data via a wireless millimeter wave communication path with one or components of device 100 such as processor 40, memory manager 42, memory 44, input/output (I/O) manager 46, I/O modules 48 and circuits 50. In particular, these various components can be implemented via a plurality of integrated circuits and each integrated circuit can include a test module 32 that includes a complementary millimeter wave transceiver for communicating with the millimeter wave transceiver 30 of probe device 105. In this fashion, the operation of one or more individual components of device 100 can be probed by probe device 105 via probe data communicated directly with these components.

Figure 3:
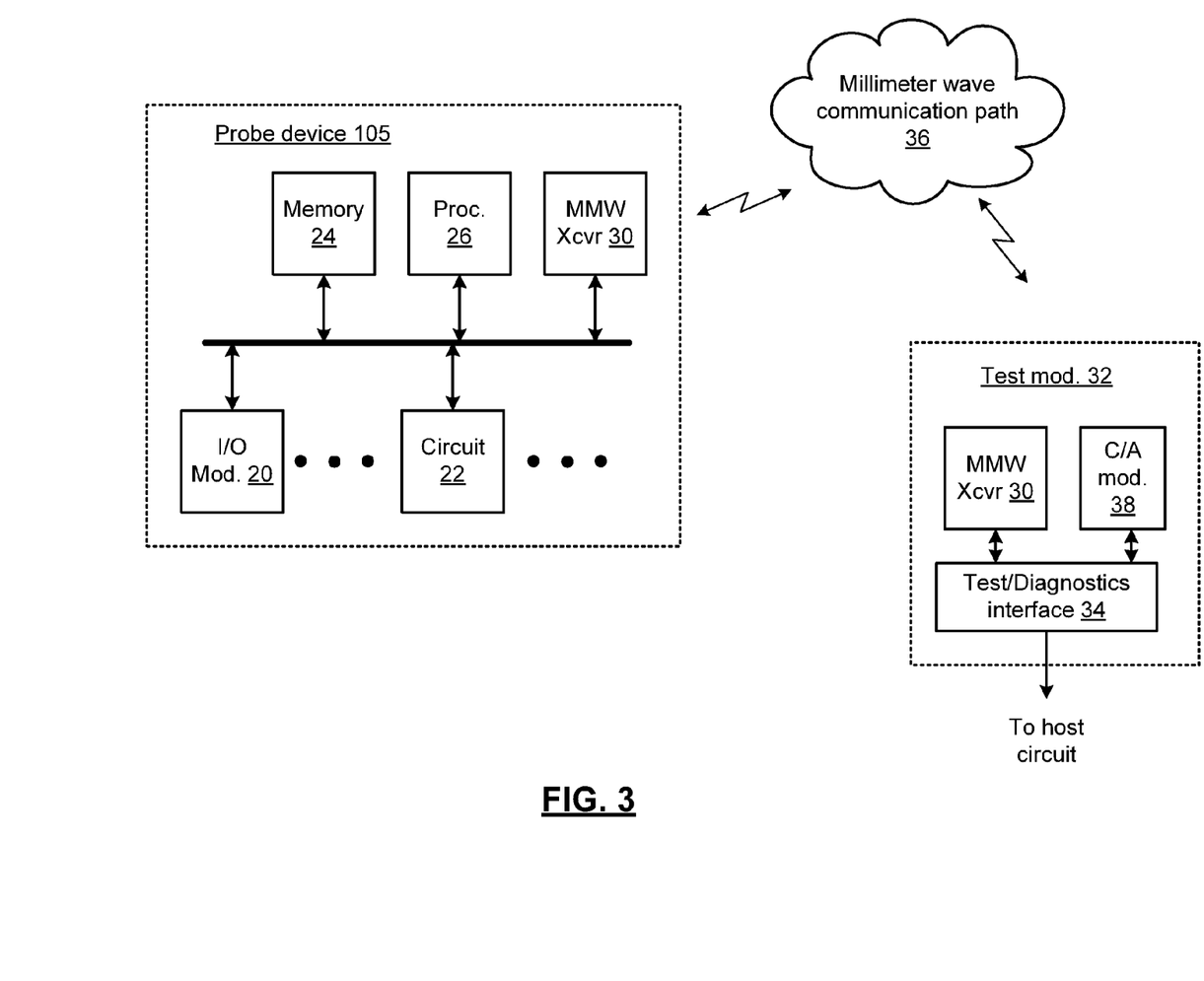
FIG. 3 presents a block diagram representation of a probe device 105 and test module 32 in accordance with an embodiment of the present invention.

Further details regarding the operation of the test modules 32, including several optional functions and features will be provided in conjunction with FIG. 3 that follows.

FIG. 3 presents a block diagram representation of a probe device 105 and test module 32 in accordance with an embodiment of the present invention. Probe device 105 include processor 26, memory 24, one or more I/O modules 20 and optionally one or more other circuits 22. In particular, probe device can be a dedicated device for running one or more probe applications corresponding to a plurality of different types of components, such as the components of device 100. In the alternative, probe device can be a computer, communication device, personal digital assistant or other multi-purpose handheld electronic device. While a particular bus architecture is shown, other architectures that include additional data busses and/or additional direct connectivity between components can likewise be implemented based on the particular functions and features of probe device 105.

In an embodiment of the present invention, processor 26 can be implemented via use of a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions to perform functions associated with the operation of the probe device 105. Memory 24 may be a single memory device or a plurality of memory devices. Such a memory device may be a read-only memory, random access memory, volatile memory, non-volatile memory, static memory, dynamic memory, flash memory, a disk drive, including a removable disk drive or nonremoveable disk drive, memory card and/or any device that stores digital information such as the operational instructions executed by the processor 26, and/or other data. Note that when the processor 26 implements one or more functions via a state machine, analog circuitry, digital circuitry, and/or logic circuitry, the associated memory storing the corresponding operational instructions can be embedded with the circuitry comprising the state machine, analog circuitry, digital circuitry, and/or logic circuitry.

I/O modules 20 can include a wireless transceiver and that is capable of placing a receiving conventional wireless telephone calls, voice over internet protocol telephone calls, communicating via a cellular voice or data protocol such as PCS, iDEN, GSM, GPRS, AMPS, UMTS, EDGE or other wireless telephony protocol that can be used to communicate with a service provider network, such as a wireless telephone or data network, via a base station or access point. I/O modules 20 can include a wireless transceiver, such as an RFID transceiver, a Bluetooth transceiver or other piconet or personal area network transceiver, a WIMAX transceiver or ultra wideband transceiver, a wireless local area network transceiver such as a 802.11a, b, g or n transceiver, or other wireless transceiver for communicating real time or non-real time data in association with one or more applications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications.

I/O modules 20 can further include a microphone, keypad/keyboard, speaker, display, camera, wireline port, such as an USB, Ethernet, Firewire, SCSI, PCI, PCMCIA or other wireline port, along with the appropriate interfaces, drivers, encoders and decoders for communicating via the wireline port, a codec for encoding voice signals into digital voice signals, a keypad/keyboard interface for generating data from a keypad/keyboard in response to the actions of a user, a display driver for driving a display, such as by rendering a color video signal, text, graphics, or other display data, and an audio driver such as an audio amplifier for driving a speaker and one or more other interfaces, such as for interfacing with a camera or the other I/O devices. Optional circuits 22 include an optional I/O manager similar to I/O manager 46, and a memory manager, similar to memory manager 42. Optional circuits 22 can also include a power management circuit that includes one or more DC-DC converters, voltage regulators, current regulators or other power supplies for supplying the device 100 and/or its peripheral devices with supply voltages and or currents (collectively power supply signals) that may be required to power these devices. Such a power management circuit can operate from one or more batteries, line power, an inductive power received from a remote device, a piezoelectric source that generates power in response to motion of the integrated circuit and/or from other power sources, not shown. In particular, power management module can selectively supply power supply signals of different voltages, currents or current limits or with adjustable voltages, currents or current limits.

As discussed in conjunction with FIG. 2, the probe device 105, via processor 26, executes a probe application that generates and receives probe data for test and/or diagnostic purposes. Probe device 105 includes a millimeter wave transceiver 30 for directly communicating probe data via a wireless millimeter wave communication path with one or components of device 100 via a corresponding test module 32 that includes a complementary millimeter wave transceiver 30 for communicating with the millimeter wave transceiver 30 of probe device 105.

Test module 32 includes a test/diagnostics interface 34 for gathering and/or storing test and diagnostics data from a host circuit, such as any of the components of device 100. In an embodiment of the present invention, the test/diagnostics interface 34 operates in accordance with a standard automatic test equipment (ATE) interface or other interface or test architecture. The test/diagnostics interface 34 can include a fault register for storing fault data from the host circuit during operation. When the host circuit either by itself, or in response to a test routine executed by test diagnostic interface 34 determines that a fault condition has occurred, diagnostics data corresponding to the status of the host circuit at the time of the fault condition, the nature or type of fault, etc. can be stored in the fault register for later retrieval and analysis by probe device 105.

In operation, the probe application of probe device 105 can communicate via the millimeter wave communication path with a particular test module 32 of a component of device 100 to receive diagnostics data from the test module. In response, the probe application can display the diagnostic data on a display device of the probe device 105. Either automatically or in response to a command received by a user of the probe device 105, the probe device can send probe data to test module 32 to reset the component, to clear the fault register, to clear a fault condition, to send test commands to run additional tests via test/diagnostics interface 34, to upload test routines to the test/diagnostics interface 34 or other data to be executed by the test/diagnostics interface 34, and upload updated or replacement software or firmware or other executable data to the component via the test/diagnostics interface 34.

For example, the probe device 105 communicates via the millimeter wave communication path 36 with a memory device, such as memory 44, that includes test module 32. The probe application can retrieve diagnostics data from the test module 32 that indicates a memory fault has occurred in the memory device. In response, the probe application can run additional tests to test the operation of the memory cells of the memory and identify a plurality of bad cells. Further the probe application can communicate with a memory manager, such as memory manager 42, to designate the bad memory cells as cells that should not be used.

In another example, the probe device 105 communicates via the millimeter wave communication path 36 with a processor, such as processor 40 that includes test module 32. The probe application can retrieve diagnostics data from the test module 32 that indicates a program fault has occurred in the execution of a particular application of processor 40 stored in memory 44. In response, the probe application can run additional tests to test the integrity of the application in memory. Further the probe application can communicate with a memory manager, such as memory manager 42 or directly with memory 44 to upload a replacement application, should a fault be detected in the application stored memory 44.

Test module 32 further includes conditional access module 38 for authenticating probe device 105 to the test module 32 and granting access to diagnostics data and other functions and features of text/diagnostic interface 34 described above in accordance with the access privileges associated with probe device 105 and or the user of probe device 105. For example, probe device can transmit to test module 32 a device identification, password, encryption key, user identification or other security data, either stored in probe device 105 or entered in probe device 105 by a user via a user interface generated by I/O module 20. In response, the conditional access module 38 can compare security data to prestored information to determine the access privileges to be granted to the probe device 105 and/or the user thereof.

In particular, conditional access module 38 can operate with a plurality of different access levels with corresponding privileges associated therewith. The different components may have different levels of access associated therewith. An I/O device, such as I/O module 48 may require a different level of access privileges than, say the processor 40 or memory 44. Further the components of device 100 may allow different levels of access to portions of the components themselves. Processor 40 can include a first section, such as an arithmetic logic unit and a second section, such as a cache that require different levels of access. Similarly, a memory may store level I data (least secure), level II data (more secure) and level III (most secure). For example, at a lowest level, a probe device 105 can only retrieve diagnostic data. At higher levels probe device 105 can issue test commands, upload test routines, updates and other executable data, alter memory, reset registers, etc.

In an embodiment of the present invention, test/diagnostics interface 34 and conditional access module 38 can be implemented via use of a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital). Test/diagnostics interface 34 and conditional access module 38 can further include a single memory device or a plurality of memory devices. Such a memory device may be a read-only memory, random access memory, volatile memory, non-volatile memory, static memory, dynamic memory, flash memory, a disk drive, including a removable disk drive or nonremoveable disk drive, memory card and/or any device that stores digital information such as the operational instructions and/or other data. Note that when the test/diagnostics interface 34 and conditional access module 38 implement one or more functions via a state machine, analog circuitry, digital circuitry, and/or logic circuitry, the associated memory storing the corresponding operational instructions can be embedded with the circuitry comprising the state machine, analog circuitry, digital circuitry, and/or logic circuitry.

Figure 4:
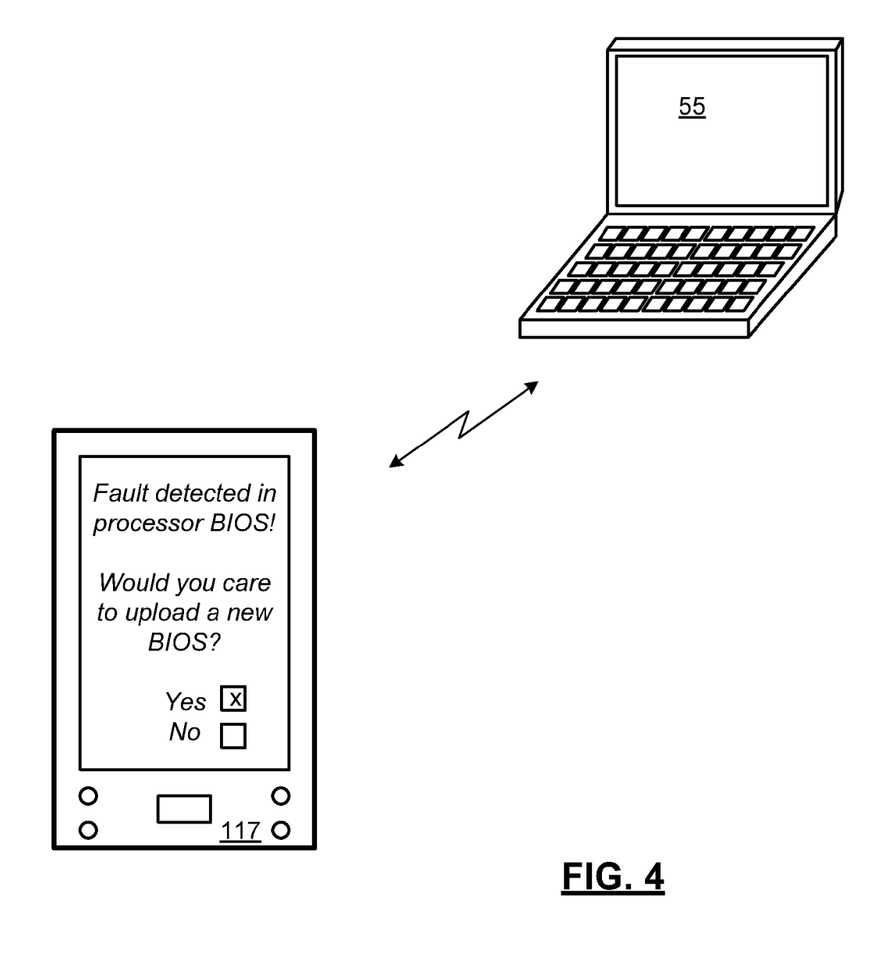
FIG. 4 presents a pictorial representation of a probe device 117 in direct communication with a processor of a laptop computer 55 in accordance with an embodiment of the present invention.

FIG. 4 presents a pictorial representation of a probe device 117 in direct communication with a processor of a laptop computer 55 in accordance with an embodiment of the present invention. In particular, a probe device 117, such as probe device 105, is implemented as a probe application executed via a personal digital assistant. In this example, the probe device 117 communicates via the millimeter wave communication path with a processor of laptop computer 55, such as processor 40 that includes test module 32. The probe application retrieves diagnostics data from the test module 32 that indicates a program fault has occurred in the execution of the BIOS stored in memory, such as a component of a memory 44.

In response, the probe application can run additional tests to test the integrity of the BIOS and indicate to the user of probe device 117 that a fault was detected. Further the probe application can communicate with a memory manager, such as memory manager 42 or directly with memory 44 to download a replacement BIOS from a server coupled to the Internet via a wireless local area network transceiver or other wireless transceiver included in the probe device 117. And in response to a user selection, upload the replacement BIOS to the laptop 55.

Figure 5:
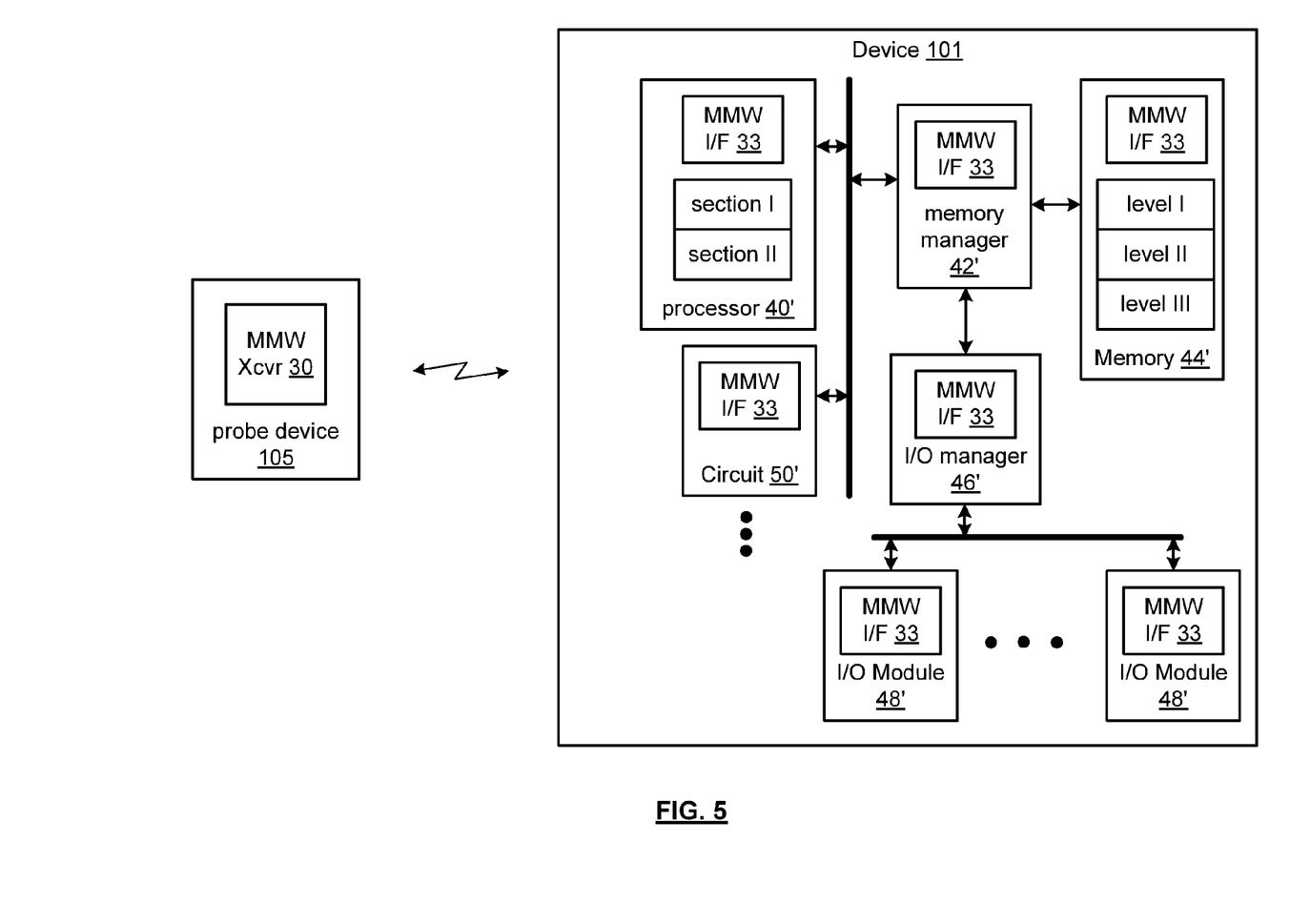
FIG. 5 presents a block diagram representation of a probe device 105 in direct communication with one or more components of device 101 in accordance with an embodiment of the present invention.

FIG. 5 presents a block diagram representation of a probe device 105 in direct communication with one or more components of device 101 in accordance with an embodiment of the present invention. In particular, a device 101 is shown that includes similar components to device 100, however, these components differ from the corresponding components of device 100 by containing millimeter wave interface 33 rather than test module 32. As will be discussed in greater detail in conjunction with FIG. 6, millimeter wave interface 33 presents a more general interface for probe device 105 for purposes that may include the functions and features described in conjunction with test module 32 and/or other functions and features unrelated to testing and diagnostics.

Figure 6:
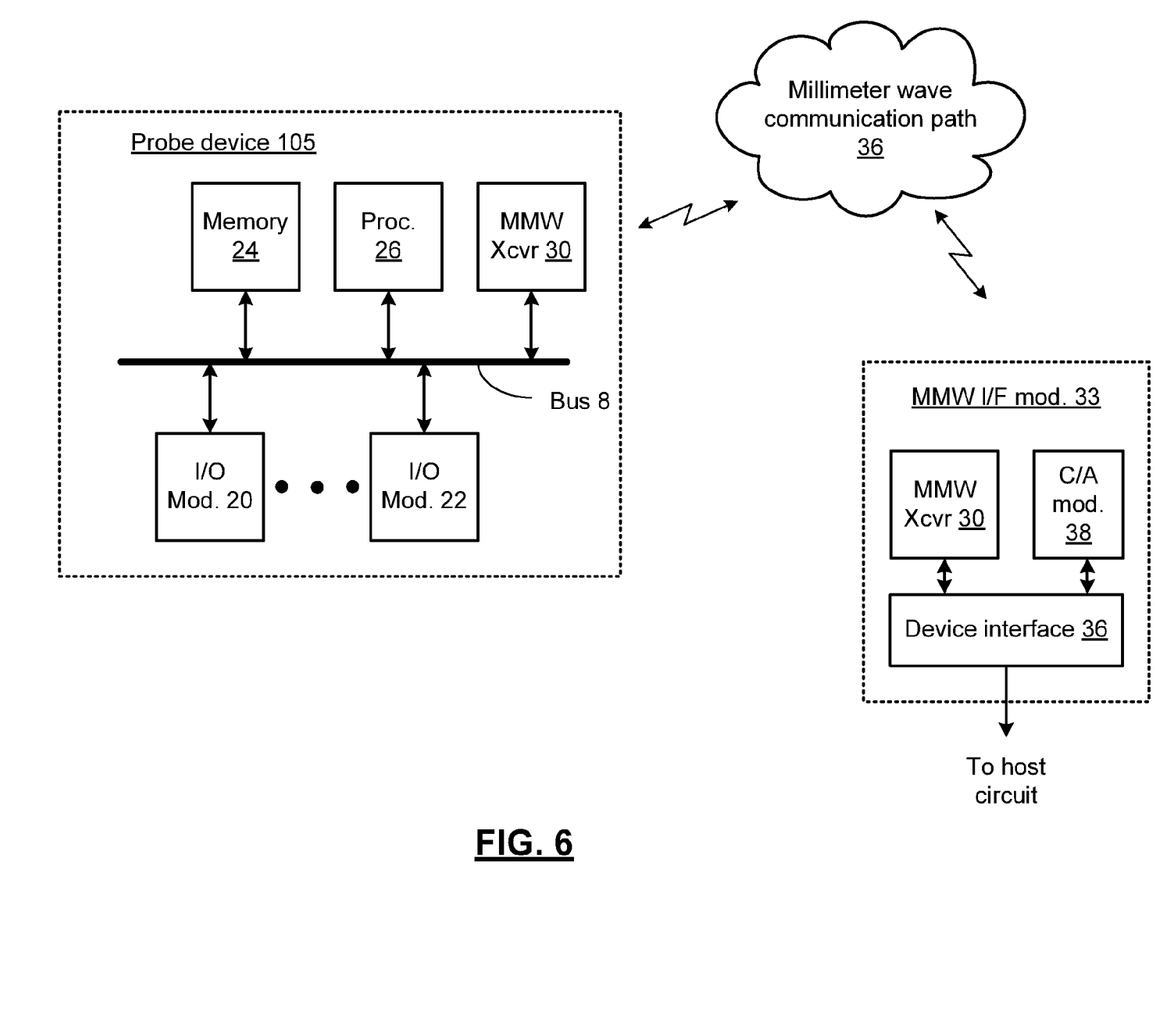
FIG. 6 presents a block diagram representation of a probe device 105 and millimeter wave interface module 33 in accordance with an embodiment of the present invention.

FIG. 6 presents a block diagram representation of a probe device 105 and millimeter wave interface module 33 in accordance with an embodiment of the present invention. Millimeter wave interface module 33 includes a device interface 36 for optionally performing the functions and features of diagnostics test interface 34 and/or for providing an interface for probe device 105 to otherwise probe the host circuit, such as any of the components of device 101.

In operation, the probe application of probe device 105 can communicate via the millimeter wave communication path with a particular millimeter wave interface module 33 of a component of device 101 to retrieve data such as stored data files and applications, buffer data, register data, and device status data, to issue commands such as reset commands and other commands, and to upload data such as media files, application data and other data files, applications and other executable data, buffer data, register data, setup data and personal profiles and preferences, to update administrative data such as security data and access privileges, etc.

For example, the probe device 105 communicates via the millimeter wave communication path 36 with a memory device, such as memory 44', that includes millimeter wave interface module 33. The probe application can retrieve probe data from the millimeter wave interface module 33 that indicates a particular version of an application stored in memory. In response, the probe application can determine if an updated version of the application exists and via communication with a server coupled to the Internet download the updated application and upload it, either directly to the memory 44' or via memory manager 42'.

In another example, the probe device 105 communicates via the millimeter wave communication path 36 with a memory device, such as memory 44', either directly or via memory manager 42'. The probe application can upload data as part of a synchronization operation of the probe device 105 and the device 101 or other upload operation. In particular, the probe application can upload media files such as audio or video files, application data and other data files such as navigational routes, map data for a navigational application, word processing files, email archives, applications and other executable data, setup data and personal profiles and preferences, security data, etc.

In a similar fashion, to test module 32, millimeter wave interface module 33 further includes conditional access module 38 for authenticating probe device 105 to the millimeter wave interface module 33 and granting access to probe data and other functions and features of millimeter wave interface module 33 described above in accordance with the access privileges associated with probe device 105 and or the user of probe device 105. For example, probe device can transmit to millimeter wave interface module 33 a device identification, password, encryption key, user identification or other security data, either stored in probe device 105 or entered in probe device 105 by a user via a user interface generated by I/O module 20. In response, the conditional access module 38 can compare security data to prestored information to determine the access privileges such as an access level to be granted to the probe device 105 and/or the user thereof.

In particular, conditional access module 38 can operate with a plurality of different access levels with corresponding privileges associated therewith. The different components may have different levels of access associated therewith. In I/O device, such as I/O module 48' may require a different level of access privileges than, say the processor 40' or memory 44'. Further the components of device 101 may allow different levels of access to portions of the components themselves. Processor 40' can include a first section, such as an arithmetic logic unit and a second section, such as a cache that require different levels of access. Similarly, a memory may store level I data (least secure), level II data (more secure) and level III (most secure). For example, at a lowest level, a probe device can only retrieve certain kinds of probe data such as media files and application data. At higher levels probe device 105 can issue commands, upload operating system routines and utilities, updates and other executable data, alter memory, reset registers, access and/or modify security data, etc.

In an embodiment of the present invention, device interface 36 and conditional access module 38 can be implemented via use of a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital). Device interface 36 and conditional access module 38 can further include a single memory device or a plurality of memory devices. Such a memory device may be a read-only memory, random access memory, volatile memory, non-volatile memory, static memory, dynamic memory, flash memory, a disk drive, including a removable disk drive or nonremoveable disk drive, memory card and/or any device that stores digital information such as the operational instructions and/or other data. Note that when the device interface 36 and conditional access module 38 implement one or more functions via a state machine, analog circuitry, digital circuitry, and/or logic circuitry, the associated memory storing the corresponding operational instructions can be embedded with the circuitry comprising the state machine, analog circuitry, digital circuitry, and/or logic circuitry.

Figure 7:
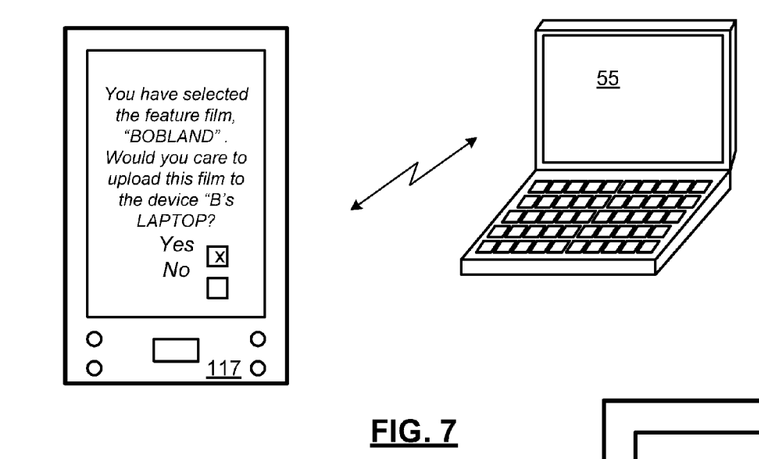
FIG. 7 presents a pictorial representation of a probe device 117 in direct communication with a memory module of a laptop computer 55 in accordance with an embodiment of the present invention.

FIG. 7 presents a pictorial representation of a probe device 117 in direct communication with a memory module of a laptop computer 55 in accordance with an embodiment of the present invention. In particular, a probe device 117, such as probe device 105, is implemented as a probe application executed via a personal digital assistant. In this example, the probe device 117 communicates via the millimeter wave communication path with a memory of laptop computer 55, such as memory 44' that includes millimeter wave interface module 33. The probe application allows the user to select a feature film, "Bobland" that is either stored in probe device 117 or retrieved from a server via the Internet. In response to a user selection, upload the media file containing the feature film to the laptop 55.

Figure 8:
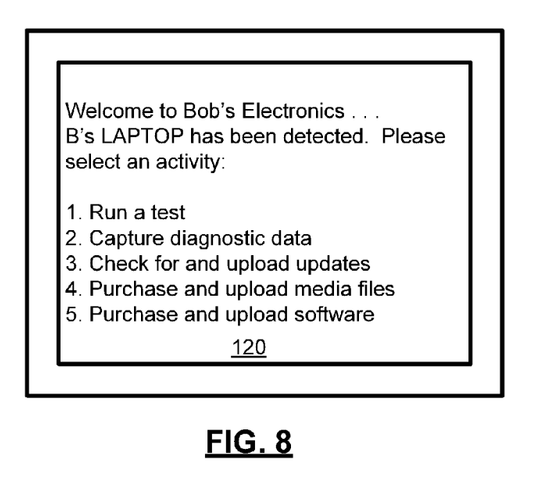
FIG. 8 presents a pictorial representation of a screen display 120 in accordance with an embodiment of the present invention.

FIG. 8 presents a pictorial representation of a screen display 120 in accordance with an embodiment of the present invention. In this embodiment of the present invention, probe device 105 is implemented in a commercial location such as a mall kiosk, store kiosk or other commercial setting that includes a display device for presenting display screens such as the example display screen 120.

In the example shown, a user of device 100 or 101 such as a laptop computer, brings his or her device to "Bob's Electronics", a store that includes a kiosk that includes probed device 105. Probe device 105 initially probes a component of the laptop, such as a memory, in accordance with a lowest access level without security, and retrieves probe data from the laptop 55 that indicates the name of the device "B's LAPTOP". The screen display generated by the probe application prompts the user to select a particular probe activity from a list. Based on the activity selected, the user can be prompted for security data to allow the required level of access to the component or components of the device 100 or 101 to implement the selected probe activity.

Figure 9:
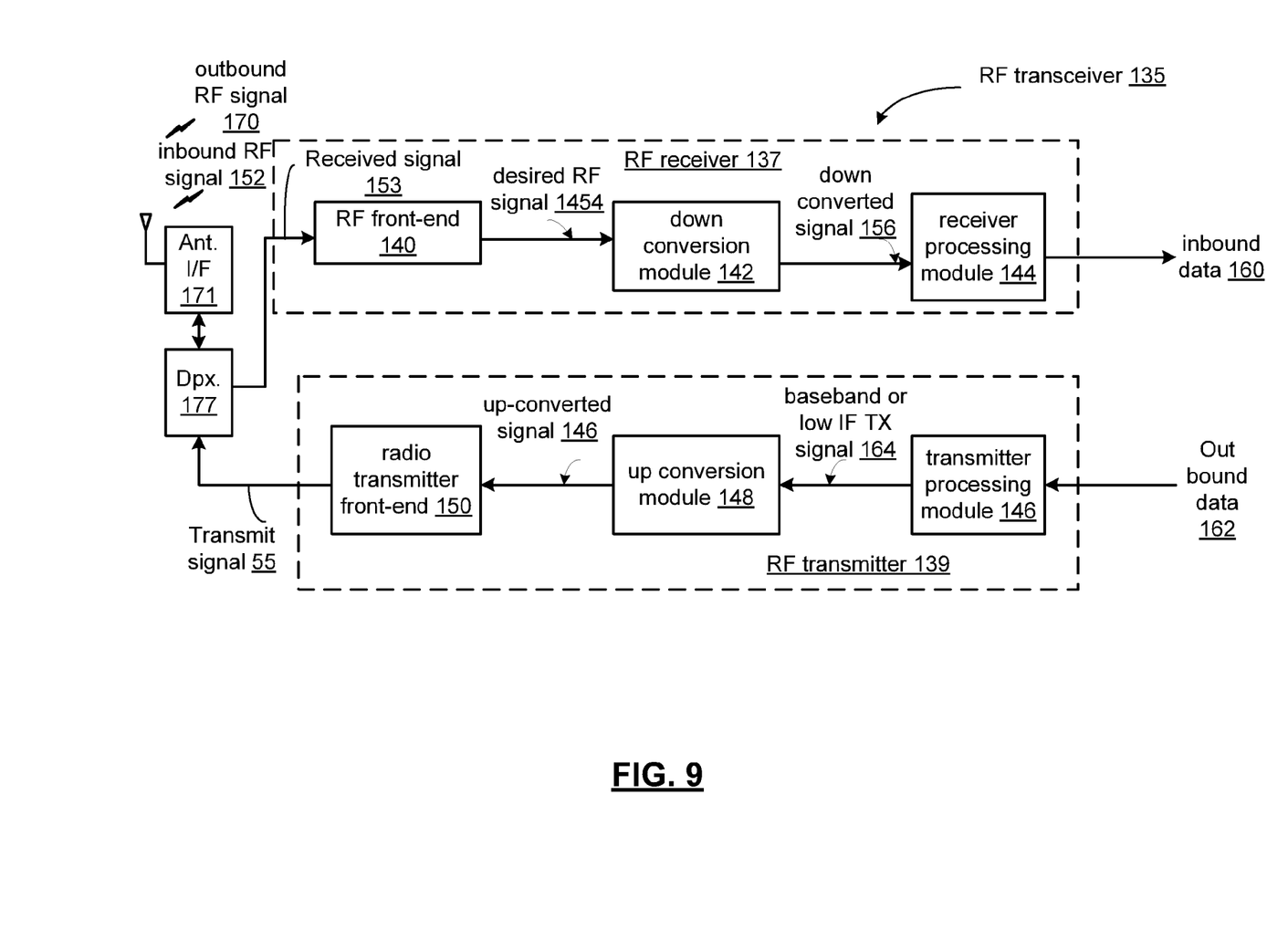
FIG. 9 represents a schematic block diagram of an embodiment of an RF transceiver 135 in accordance with the present invention.

FIG. 9 is a schematic block diagram of an embodiment of RF transceiver 135 in accordance with the present invention. The RF transceiver 135, such as millimeter wave transceiver 30 includes an RF transmitter 139, and an RF receiver 137. The RF receiver 137 includes a RF front end 140, a down conversion module 142 and a receiver processing module 144. The RF transmitter 139 includes a transmitter processing module 146, an up conversion module 148, and a radio transmitter front-end 150.

As shown, the receiver and transmitter are each coupled to an antenna through an off-chip antenna interface 171 and a diplexer (duplexer) 177, that couples the transmit signal 155 to the antenna to produce outbound RF signal 170 and couples inbound signal 152 to produce received signal 153. Alternatively, a transmit/receive switch can be used in place of diplexer 177. While a single antenna is represented, the receiver and transmitter may share a multiple antenna structure that includes two or more antennas. In another embodiment, the receiver and transmitter may share a multiple input multiple output (MIMO) antenna structure, diversity antenna structure, phased array or other controllable antenna structure that includes a plurality of antennas. Each of these antennas may be fixed, programmable, and antenna array or other antenna configuration. Also, the antenna structure of the wireless transceiver may depend on the particular standard(s) to which the wireless transceiver is compliant and the applications thereof.

In operation, the transmitter receives outbound data 162 that such as probe data from probe device 105 or devices 100 or 101 via the transmitter processing module 146. The transmitter processing module 146 packetizes outbound data 162 in accordance with a millimeter wave protocol or wireless telephony protocol, either standard or proprietary, to produce baseband or low intermediate frequency (IF) transmit (TX) signals 164 that includes an outbound symbol stream that contains outbound data 162. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 can include, but is not limited to, scrambling, encoding, puncturing, mapping, modulation, and/or digital baseband to IF conversion.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up-converted signals 166 based on a transmitter local oscillation.

The radio transmitter front end 150 includes a power amplifier and may also include a transmit filter module. The power amplifier amplifies the up-converted signals 166 to produce outbound RF signals 170, which may be filtered by the transmitter filter module, if included. The antenna structure transmits the outbound RF signals 170 to a targeted device such as probe device 105 or devices 100 or 101 via an antenna interface 171 coupled to an antenna that provides impedance matching and optional bandpass filtration.

The receiver receives inbound RF signals 152 via the antenna and off-chip antenna interface 171 that operates to process the inbound RF signal 152 into received signal 153 for the receiver front-end 140. In general, antenna interface 171 provides impedance matching of antenna to the RF front-end 140, optional bandpass filtration of the inbound RF signal 152.

The down conversion module 142 includes a mixing section, an analog to digital conversion (ADC) module, and may also include a filtering and/or gain module. The mixing section converts the desired RF signal 154 into a down converted signal 156 that is based on a receiver local oscillation 158, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156 that includes a inbound symbol stream. Note that the ordering of the ADC module and filtering and/or gain module may be switched, such that the filtering and/or gain module is an analog module.

The receiver processing module 144 processes the baseband or low IF signal 156 in accordance with a millimeter wave protocol, either standard or proprietary to produce inbound data 160 such as probe data received from probe device 105 or devices 100 or 101. The processing performed by the receiver processing module 144 can include, but is not limited to, digital intermediate frequency to baseband conversion, demodulation, demapping, depuncturing, decoding, and/or descrambling.

In an embodiment of the present invention, receiver processing module 144 and transmitter processing module 146 can be implemented via use of a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip. Such a memory device may be a read-only memory, random access memory, volatile memory, non-volatile memory, static memory, dynamic memory, flash memory, and/or any device that stores digital information. Note that when the processing devices implement one or more of their functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

While the processing module 144 and transmitter processing module 146 are shown separately, it should be understood that these elements could be implemented separately, together through the operation of one or more shared processing devices or in combination of separate and shared processing.

Figure 10:
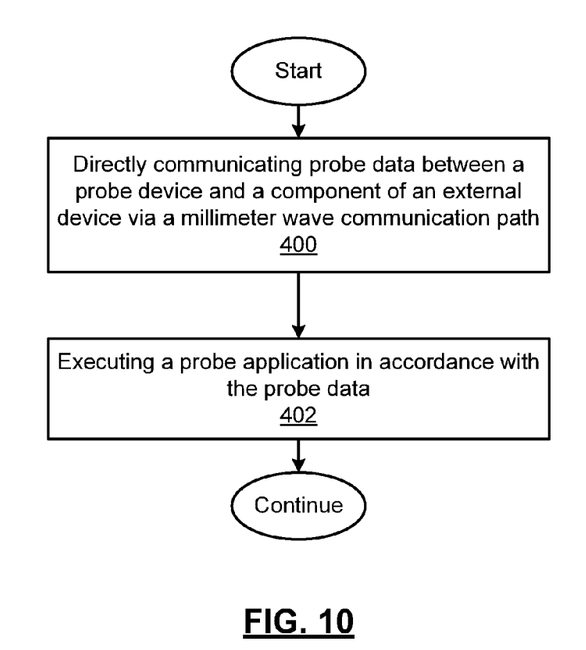
FIG. 10 is a flow chart representation of a method in accordance with an embodiment of the present invention.

FIG. 10 presents a flowchart representation of a method in accordance with an embodiment of the present invention. In particular, a method is presented for use in conjunction with one or more functions or features described in conjunction with FIGS. 1-9. In step 400, probe data is directly communicated between a probe device and a component of an external device via a wireless millimeter wave communication path. In step 402, a probe application is executed in accordance with the probe data.

In an embodiment of the present invention, the probe data includes diagnostics data received via the millimeter wave communication path from a test module of the component. The probe data can also include executable data sent to the component in response to the diagnostics data, a test command generated by the probe application and sent by via the millimeter wave communication path to a test module of the component and/or a media file.

Figure 11:
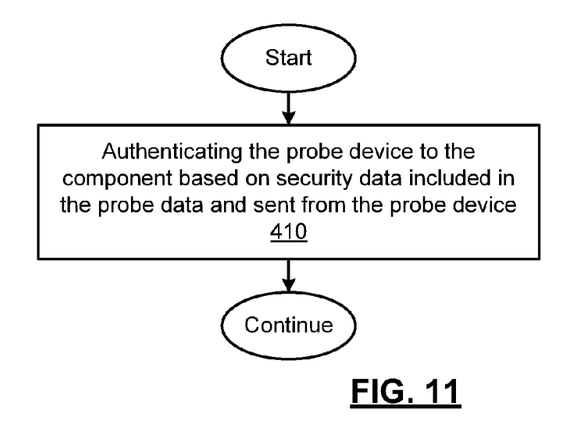
FIG. 11 is a flow chart representation of a method in accordance with an embodiment of the present invention.

FIG. 11 presents a flowchart representation of a method in accordance with an embodiment of the present invention. A method is presented for use in conjunction with one or more functions or features described in conjunction with FIGS. 1-10. In particular, the probe data includes security data sent from the probe device, and the method includes step 410 of authenticating the probe device to the component, based on the security data.

Figure 12:
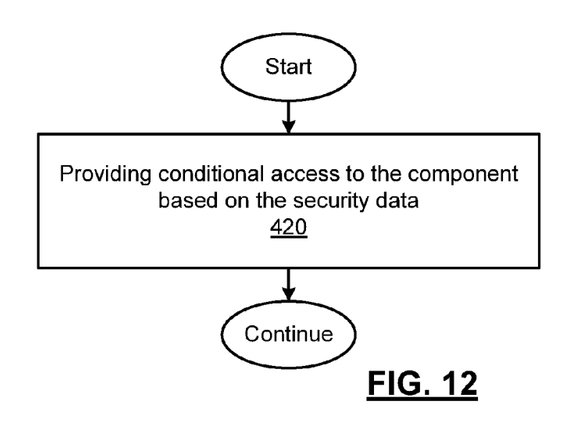
FIG. 12 is a flow chart representation of a method in accordance with an embodiment of the present invention.

FIG. 12 presents a flowchart representation of a method in accordance with an embodiment of the present invention. In particular, a method is presented for use in conjunction with one or more functions or features described in conjunction with FIGS. 1-11. In step 420, a level of conditional access to a component is provided based on the security data. In an embodiment of the present invention, the probe data includes executable data sent to the component in accordance with the level of conditional access.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A probe device comprising:
a millimeter wave transceiver for directly communicating probe data relating to performance of an integrated circuit of an external device via a wireless millimeter wave communication path to a wireless transceiver of the integrated circuit; and
a processing device, coupled to the millimeter wave transceiver, for executing a probe application in accordance with the probe data to probe the integrated circuit via the wireless millimeter wave communication path without physically connecting to the integrated circuit.

2. The probe device of claim 1 wherein the probe data includes diagnostics data received via the millimeter wave communication path from a test module of the integrated circuit of the external device.

3. The probe device of claim 2 wherein the probe data includes executable data sent to the integrated circuit of the external device in response to the diagnostics data.

4. The probe device of claim 1 wherein the probe data includes a test command generated by the probe application and sent by via the millimeter wave communication path to a test module of the integrated circuit of the external device.

5. The probe device of claim 1 wherein the integrated circuit of the external device includes one of: a processor, a memory manager, a memory, an input/output manager, and an input/output device.

6. The probe device of claim 1 wherein the probe data includes security data sent from the probe device to authenticate the probe device to the integrated circuit of the external device.

7. The probe device of claim 6 wherein the integrated circuit of the external device provides conditional access based on the security data.

8. The probe device of claim 7 wherein the probe data includes executable data sent to the integrated circuit of the external device in accordance with the conditional access.

9. The probe device of claim 1 wherein the probe data includes a media file.

10. The probe device of claim 1 wherein the millimeter wave communication path includes a 60 GHz frequency band.

11. An electronic device comprising:
a millimeter wave transceiver of an integrated circuit for directly communicating probe data of the integrated circuit with a probe device via the wireless millimeter wave communication path without physically connecting to the probed device; and
a test/diagnostic interface, coupled to the millimeter wave transceiver, for storing diagnostic data corresponding to the integrated circuit, and for retrieving the diagnostic data for communication as probe data to the probe device.

12. The electronic device of claim 11 wherein the probe data further includes executable data sent to the test/diagnostic interface in response to the diagnostics data.

13. The electronic device of claim 11 wherein the probe data includes a test command received from the probe device and wherein the test/diagnostic interface executes the test command to perform a test on the at least one component.

14. The electronic device of claim 11 wherein the integrated circuit includes at least one of: a processor, a memory manager, a memory, an input/output manager, and an input/output device.

15. The electronic device of claim 11 further comprising;
a conditional access module, coupled to the test/diagnostic interface, to authenticate the probe device based on security data;
wherein the probe data includes security data sent from the probe device via the millimeter wave communication path.

16. An electronic device comprising:
an integrated circuit;
a millimeter wave transceiver for directly communicating probe data of the integrated circuit with a probe device via the wireless millimeter wave communication path without physically connecting to the probe device;
a device interface, coupled to the millimeter wave transceiver, for communicating the probe data with the integrated circuit; and
a conditional access module, coupled to the device interface, to authenticate the probe device based on security data;
wherein the probe data includes security data sent from the probe device via the millimeter wave communication path.

17. The electronic device of claim 16 wherein the probe data includes executable data sent to integrated circuit in accordance with the conditional access.

18. The electronic device of claim 16 wherein the probe data includes a media file.

19. A method comprising:
directly communicating probe data between a probe device and an integrated circuit of an external device via a wireless millimeter wave communication path to a wireless transceiver of the integrated circuit; and
executing a probe application in accordance with the probe data to probe the integrated circuit via the wireless millimeter wave communication path without physically connecting to the integrated circuit.

20. The method of claim 19 wherein the probe data includes diagnostics data received via the millimeter wave communication path from a test module of the integrated circuit of the external device.

* * * * *